United States Patent Office 3,038,786
Patented June 12, 1962

3,038,786
PROCESS FOR THE CYCLIC PRODUCTION OF HYDROGEN PEROXIDE
Kizo Hiratsuka, 1401, Fujisawa, Fujisawa-shi, Kanagawa-ken, Japan; and Shiro Matsumura, 1146, 1-chome, Mejiro-cho, Toshima-ku; Masatsugi Matsuda, 66, Nakane-cho, Meguro-ku; Kiyoshi Takagi, 2489, 5-chome, Niijuku-cho, Kanamachi, Katsushika-ku; and Zenichiro Kasawara, 23, Uenosakuragi-cho, Daito-ku, all of Tokyo, Japan; and Tadao Oono, 4902, Kamikizaki, Urawa-shi, Saitama-ken, Japan; Tetsuya Abe, 23, Uenosakuragi-cho, Daito-ku, Tokyo, Japan; and Noriaki Ozawa, 1971, Uchiyama, Minamiashigara-cho, Ashigara Kami-gun, Kanagawa-ken, Japan
No Drawing. Filed Dec. 16, 1959, Ser. No. 859,837
Claims priority, application Japan Dec. 19, 1958
6 Claims. (Cl. 23—207)

The present invention relates to a method to produce hydrogen peroxide in the cyclic process using alkyl-anthraquinones as working mediums and more particularly it relates to a new and improved method employing a mixture of alkyl anthraquinones in solvents.

The British Patent 465,070 discloses a process for the production of hydrogen peroxide using a solution containing two or more of the hydrogenation products of anthra-quinones or their homologues or substitution products or both, but it merely shows the fact that several anthra-quinones may be used in a mixed state. It discloses neither a suitable type of a mixture nor the effect and characteristics of the mixing in the cyclic production of hydrogen peroxide.

One object of the invention is to provide an efficient cyclic process for the production of hydrogen peroxide wherein a mixture of specific alkyl anthraquinones is employed in relation to solvents. Another object of the invention is to provide a certain composition of the alkyl anthraquinones employed for maximum yield of hydrogen peroxide per volume of working solutions. Further objects will be apparent from the following description.

According to the present invention, as a working medium a mixture of 2-tertiary-amylanthraquinone and 2-iso-secondary-amylanthraquinone is employed at a ratio of 50–95 wt. percent of the former to 50–5 wt. percent of the latter. This mixture is dissolved in a mixed solvent composed of a first solvent which is either benzene, alkyl-substituted benzene or alkyl-substituted naphthalene and a second solvent which is either an aliphatic alcohol having from 7–11 carbon atoms of alkyl-cyclohexanol. The volume ratio between first and second solvent may range between 40–60:60–40.

According to a preferred embodiment, the mixed solvent is a mixture of xylene and di-isobutylcarbinol.

The preferred weight ratio between 2-tertiary amyl-anthraquinone and 2-iso-secondary amylanthraquinone is 65–75 wt. percent: 35–25 wt. percent.

In U.S. Patent 2,668,753 it has been suggested to use 2-secondary-amylanthraquinone. In this specification mixed solvents consisting of primary and secondary nonyl alcohol and monomethyl- and dimethyl-substituted naphthalene are proposed and in addition to the proposal of the solvents the use of 2-tertiary-butylanthraquinone is suggested. But the actual use of 2-secondary-amyl-anthraquinone and the unexpected result of the use of the compound with 2-tertiary-amylanthraquinone are not mentioned.

2-tertiary-amylanthraquinone and 2-iso-secondary-amyl-anthraquinone are formulated respectively as follows:

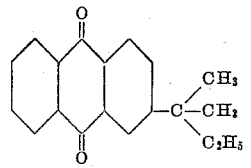

2-tertiary-amylanthraquinone

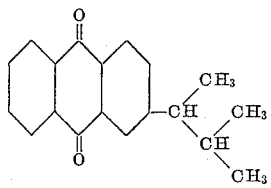

2-iso-secondary-amylanthraquinone

The above-described process for the production of hydrogen peroxide was originally performed with 2-ethyl-anthraquinone as a working medium, using an equivolumetric mixture of benzene and iso-heptylalcohol as a solvent (PB 43360). However, the concentration of hydrogen peroxide obtained according to this method was only 5.5 g./l. of the working solution, because of the difficulty to obtain a high concentration of the anthraquinone especially that of the anthrahydroquinone, which is a reduced form of the former. Consequently, not only a large amount of working solution and large scale plants were needed as compared with the quantity of hydrogen peroxide produced, but furthermore, the maximum concentration of the extracted hydrogen peroxide was 20–25% at the highest. To overcome this drawback many investigations have been made regarding both the working medium and the solvent. An improved method was reported in U.S. Patent 2,689,169, in which the concentrations of anthraquinone and anthrahydroquinone were so much increased by using 2-tertiary-butylanthraquinone that 13 g. of hydrogen peroxide could be obtained per 1 l. of the working solution.

Aiming to improve the solubility of alkylanthraquinone, we have studied the natures of mixtures consisting of several anthraquinones, for example 2-ethyl-, 2-isopropyl-, 2-secondary butyl-, 2-tertiary butyl-, 2-iso-secondary amyl-, 2-tertiary amylanthraquinone in various ratios, and have investigated the relations between the solubilities of their anthraquinone form and anthrahydroquinone form in various solvents and the yield of hydrogen peroxide. As the first achievement of this investigation, it was discovered that the alkylanthraquinones have a composition to show the lowest melting point and the anthraquinone mixtures at this composition have remarkably high solubility to various solvents (see British Patent No. 875,189).

However, for the purpose of hydrogen peroxide production, high concentration of anthraquinone alone has no value, unless its anthrahydroquinone is also highly soluble. Furthermore, the working solution should satisfy the following requirements as much as possible, besides good yield of hydrogen peroxide per unit volume: High hydrogenating and oxygenating velocity, large distribution coefficient of hydrogen peroxide, low density, and satisfactory chemical stability. Consequently, the improvement of the working medium should be considered in relation to the solvent. The inventors discovered as the results of subsequent investigations that amylanthraquinone of the present invention gives a better yield of hydrogen peroxide than any other hitherto known anthraquinones or mixtures, which are employed with a mixture of aromatic hydrocarbon and aliphatic alcohol or alicyclic alcohol, which is the most common solvent suitable for the abovementioned working solution. Furthermore, the most suitable composition of amylanthraquinone mixture which we have already mentioned was quite independent of the eutectic mixture. This fact will be well understood when considering that the yield of hydrogen peroxide depends on the solubility of the anthrahydroquinone and not on that of anthraquinone. Various mixing ratios of alkylanthraquinones and the solubilities of anthraquinones and anthrahydroquinones in equivolumetric mixture of xylene and di-iso-butylcarbinol, as well as the yield of hydrogen peroxide are shown in Tables 1, 2 and 3.

TABLE 1

2-Ethylanthraquinone—2-Tertiarybutylanthraquinone

| 2-Ethylanthraquinone, percent | 100 | 70 | 45* | 30 | 20 | 0 |
| --- | --- | --- | --- | --- | --- | --- |
| Solubility of anthraquinone | 0.44 | 1.3 | 2.2 | 1.5 | 1.2 | 0.81 |
| Solubility of anthrahydroquinone | 0.11 | 0.19 | 0.21 | 0.22 | 0.245 | 0.27 |
| Yield of hydrogen peroxide | 3.7 | 6.3 | 7.2 | 7.6 | 8.3 | 9.3 |

Footnotes under Table 3.

TABLE 2

2-Ethylanthraquinone—2-Secondary-butylanthraquinone

| 2-Ethylanthraquinone | 100 | 80 | 66 | 27 | 20 | 0 |
| --- | --- | --- | --- | --- | --- | --- |
| Solubility of anthraquinone | 0.44 | 0.60 | 0.79 | 2.3 | 2.0 | 1.7 |
| Solubility of anthrahydroquinone | 0.11 | 0.14 | 0.16 | 0.13 | 0.10 | 0.05 |
| Yield of hydrogen peroxide | 3.7 | 4.8 | 5.4 | 4.4 | 3.4 | 1.7 |

TABLE 3

2-Tertiary-Amylanthraquinone—2-Iso-Secondary-Amylanthraquinone

| 2-Tertiary-amylanthraquinone | 100 | 70 | 45* | 30 | 10 | 0 |
| --- | --- | --- | --- | --- | --- | --- |
| Solubility of anthraquinone | 1.1 | freely miscible | freely miscible | freely miscible | freely miscible | 1.62 |
| Solubility of anthrahydroquinone | 0.4 | 0.48 | 0.35 | 0.31 | 0.22 | 0.16 |
| Yield of hydrogen peroxide | 13.8 | 16.1 | 11.7 | 10.6 | 7.5 | 5.7 |

*Composition of eutectic point.
Solvent: Xylene di-iso-butylcarbinol (50:50 volume).
Solubility of anthraquinone: mole/l.
Solubility of anthrahydroquinone: mole/l.
Yield of hydrogen peroxide: g./l. solution.

From Tables 1, 2 and 3 it is clear that anthraquinones have the composition of eutectic point and this induces a good solubility in the solvent but the yield of hydrogen peroxide reaches its maximum at a different value.

As a rule, a composition giving the highest yield of hydrogen peroxide, deviates from its eutectic point toward the direction of an anthraquinone which has more anthrahydroquinone solubility than another. In some cases, anthrahydroquinone has no maximum in the solubility as shown in Table 1. The amyl-anthraquinone mixture shows the greatest solubility of the hydroquinone among these combinations. The composition which gives the best yield of hydrogen peroxide is that of 2-tertiary-amyl-anthraquinone 70% and 2-iso-secondary-amylanthraquinone 30%. The best known solvents for this cyclic production of hydrogen peroxide are the mixed solvents consisting of aromatic hydrocarbon, for example, benzene, alkyl substituted benzene, or alkyl substituted naphthalene such as methylnaphthalene and aliphatic or alicyclic alcohols, for example, an aliphatic alcohol having from 7 to 11 carbon atoms such as iso-heptyl alcohol, 2-ethyl-hexanol, di-iso-butylcarbinol or an alkylcyclohexanol such as methylcyclohexanol. The mixed solvents of this type have the following advantages, so that they have been widely used since provided by I.G. (B.P. 465,070, U.S.P. 2,689,169, U.S.P. 2,739,042).

(1) The viscosity is low and the velocity of hydrogenation and oxidation is high.
(2) Because of its low density, the solvent is easily separated from the aqueous layer.
(3) Distribution coefficient of hydrogen peroxide is high.
(4) It is chemically stable.
(5) It is cheap and easily obtainable.

Anthraquinone is soluble in aromatic hydrocarbons but is scarcely soluble in alcohols, on the contrary, anthrahydroquinone is soluble in alcohol while insoluble in aromatic hydrocarbons. Further, the solubility of anthrahydroquinone in alcohols is generally quite low compared with the solubility of anthraquinone in aromatic hydrocarbons. For example, 2-ethylanthraquinone shows the solubility of 193 g./l. at 30° C. in xylene, but the solubility of 2-ethylanthrahydroquinone is only 48 g./l. in di-iso-butylcarbinol. Further the solubilities of 2-iso-secondary-amylanthraquinone and the anthrahydroquinone in the abovementioned solvents are 2177 g. and 82 g. respectively. Therefore, when an aromatic hydrocarbon and an alcohol are mixed together at about equal volume, the yield of hydrogen peroxide is limited by the poor solubility of anthrahydroquinone in the alcohol. The method by Pfleiderer (PB 4336) gave only 5.5 g./l. yield of hydrogen peroxide, which result can also be understood because of the poor solubility of the anthrahydroquinone in iso-heptanol. An attempt to overcome this problem, was made by changing the mixing ratio in order to increase the alcohol content (U.S.P. 2,668,753), but, according to this method, the viscosity of the solvent increases and the distribution coefficient becomes lower. Therefore, the velocity of hydrogenation and oxidation becomes slower, and in spite of the increase of the solubility of the hydroquinone, the concentration of the extracted hydrogen peroxide does not increase at all. It has also been proposed to use phosphoric acid esters as the solvent for the hydroquinone in place of alcohols (U.S.P. 2,537,655) but because of its high viscosity and also of the possibility of hydrolysis, this method is also unsatisfactory. Consequently, to increase the yield of hydrogen peroxide by using a mixed solvent of aromatic hydrocarbons and alcohols and keeping its practical advantages, such anthraquinone or anthraquinone mixture should be selected which possess high solubility in its anthrahydroquinone form by themselves. This requirement cannot be fulfilled by any alkylanthraquinone or anthraquinone mixture hitherto known.

The use of the anthraquinone mixture according to the present invention aims at the improvement in such a point. The working solution according to this invention keeps the high yield of hydrogen peroxide, and at the same time has adequate viscosity, density and distribution coefficient and it shows a great improvement compared with hitherto known working solutions.

This fact is clearly shown in Table 4. The example using known working solutions are also shown for the contrast.

TABLE 4

*Comparison of Working the Solution*

| | Solvents | | Initial concentration | Yield of hydrogen peroxide | Viscosity | Density | Distribution coefficient |
|---|---|---|---|---|---|---|---|
| 2-Am | Xylene | 50 | 500 | 16.1 | 3.0 | 0.923 | 49 |
| | Di-isobutyl-carbinol | 50 | | | | | |
| | Xylene | 50 | 275 | 15.1 | 1.8 | 0.890 | 52 |
| | Di-isobutyl-carbinol | 50 | | | | | |
| 2-Et | Amylnaphthalene | 70 | 105 | 8.5 | 11.9 | 0.974 | 32 |
| | Tri-octyl phosphate | 30 | | | | | |
| 2-t Bu | α-Methyl-naphthalene | 40 | 175 | 13.0 | 4.6 | 0.930 | 40 |
| | Di-isobutyl-carbinol | 60 | | | | | |
| 2-Et | Benzene | 50 | 100 | 5.5 | 1.5 | -------- | 50 |
| | Iso-heptyl-alcohol | 50 | | | | | |

The mixing ratio of amylanthraquinone mixture according to this invention does not necessarily change with the type of aromatic hydrocarbons and alcohols. However, the yields of hydrogen peroxide change slightly depending on the type of alcohols and also on the initial concentration of anthraquinone. These facts are clear by Table 5. Namely, in spite of the changes in the type of aromatic hydrocarbon and that of alcohols, the composition which gave the best yield of hydrogen peroxide is that of 2-tertiary-amylanthraquinone 70:2-iso-secondary-amylanthraquinone 30. Further, in the mixing ratio of the solvents, the ratio of hydrocarbons to alcohol is most favorable around 50:50 but it is also possible to vary the ratio in the range of about (40–60):(60–40) without losing the superiority of this invention. Namely, in this range, the viscosity is low and the distribution coefficient is also large (at least, over 40), consequently it is possible to obtain hydrogen peroxide of the concentration of 35–40% by extraction only.

TABLE 5

*Type of Solvents and Yield of Hydrogen Peroxide*

| 2-tertiary-amyl-anthraquinone, percent | | 100 | 70 | 45 | 30 | 10 | 0 |
|---|---|---|---|---|---|---|---|
| Xylene (50) | Solubility of anthraquinone. | 1.1 | freely miscible | freely miscible | freely miscible | freely miscible | 1.6 |
| 2-Ethyl-hexanol (50) | Solubility of anthrahydroquinone. | 0.38 | 0.43 | 0.32 | 0.29 | 0.20 | 0.15 |
| | Yield of hydrogen peroxide. | 12.8 | 14.6 | 10.9 | 9.8 | 6.8 | 5.1 |
| Higher boiling alkylbenzene (50)* | Solubility of anthraquinone. | 1.1 | freely miscible | freely miscible | freely miscible | freely miscible | 1.6 |
| Di-isobutyl-carbinol (50) | Solubility of anthrahydroquinone. | 0.36 | 0.44 | 0.32 | 0.28 | 0.20 | 0.15 |
| | Yield of hydrogen peroxide. | 12.1 | 14.9 | 10.9 | 9.8 | 6.8 | 5.1 |

*Higher boiling alkylbenzene: aromatic hydrocarbon of 160–190° C.B.P., for example a distillation residue, which is obtained after distillation of benzene, toluene and xylene from aromatic hydrocarbon extracted by means of UDEX extracting method.
Solubility of anthraquinone: mol/l.
Solubility of anthrahydroquinone: mol/l.
Yield of hydrogen peroxide: g/l.

The amylanthraquinone mixture according to this invention can be obtained by mixing the anthraquinones which are synthesized separately, but it is favorable from the technical standpoint to obtain it from fusel amyl-alcohol mainly consisting of isoamylalcohol as follows. The abovementioned fusel amylalcohol which is obtainable as the byproduct of alcohol fermentation is catalytically dehydrated by the use of activated alumina and the obtained mixed amylene is introduced under stirring into excess of benzene containing aluminum chloride and thus obtained amylbenzene mixture is then separated by fractional distillation, condensing said amylbenzene with phthalic-anhydride in the presence of anhydrous aluminium chloride, to obtain 2-(4'-amylbenzoyl-)-benzoic acid which is further converted to the amylanthraquinone by the dehydrating cyclization with sulfuric acid.

In this process, selecting the proper condition of the dehydration, the composition of the amylbenzene can be adequately closed to the side of tertiary amyl. Consequently, the synthesis of amylanthraquinone by this method provides an economical method giving advantage for the application of this invention in industrial scale.

EXAMPLE 1

200 g. of the 2-mixed amylanthraquinone consisting of 2-tertiary-amylanthraquinone in the weight ratio of 65:35 (more preferably 70:30) were dissolved in 500 cc. of diiso-butylcarbinol and 500 cc. of xylene as a mixed solvent. The concentration of the used anthraquinone corresponds to 169 g. per litre of solution. Taking 50 cc. of the solution, 1 g. of hydrogenating catalyst carrying 1% of palladium on the spinel type oxide of $MgAl_2O_4$ was added. Then the solution was hydrogenated at 1 atm. and 30° C. After about 70% of hydrogen of the theoretical quantity has been absorbed, the catalyst was filtered off and the solution was oxidized with air to obtain 0.5 g. of hydrogen peroxide by extraction with distilled water. This yield of hydrogen peroxide amounts to 97% of the consumed hydrogen.

EXAMPLE 2

The mixed amylanthraquinone of Example 1 was dissolved in an equivolumetric mixture of xylene and di-iso-butylcarbinol at the concentration of 222 g./l. (0.8 mol/l.). This solution was continuously cycled through the catalytically hydrogenating apparatus which has a diffuser at the bottom for introduction of hydrogen and then through the oxidizing apparatus which is filled up with porcelain Raschig rings, and the multi-stage extracting tower using perforated plates. This process is a typical method for the production of hydrogen peroxide using 2-alkyl-anthraquinone.

After repeating the abovementioned process for 30 days continuously, the anthraquinone solution was analysed. As the result, it was shown that about 2.2% of anthraquinone was converted into a compound useless for the production of hydrogen peroxide. The yield of hydrogen peroxide was 89% calculated from the consumed hydrogen during this period.

EXAMPLE 3

The 2-mixed amylanthraquinone of the composition of Example 1 was dissolved in an equivolumetric mixture of higher boiling alkylbenzene and di-isobutylcarbinol given in Table 5 at the concentration of 0.8 mol/l. Taking 50 cc. of this solution, the solution was hydrogenated catalytically under the same conditions as in Example 1 and 0.48 g. of hydrogen peroxide was extracted. This amounts to 88% of the consumed hydrogen.

Having thus described the invention, what is claimed as new and desired to be secured by Letters Patent is:

1. In a cyclic process for the production of hydrogen peroxide wherein alkylanthraquinone is catalytically hydrogenated in a solvent to the corresponding hydroanthraquinone and the latter is oxidized to produce hydrogen peroxide and alkylanthraquinone which is separated and returned to the hydrogenating stage, the improvement which comprises employing as alkylanthraquinone an amylanthraquinone mixture consisting of 2-tertiary-amylanthraquinone and 2-iso-secondary-amylanthraquinone at a ratio of 50–95 wt. percent of the former to 50–5 wt. percent of the latter, said mixture being dissolved in a mixed solvent composed of a first solvent selected from the group consisting of benzene, alkyl substituted benzene and alkyl substituted naphthalene and a second solvent selected from the group consisting of aliphatic alcohols having from 7 to 11 carbon atoms and alkylcyclohexanol, in a volume ratio range between first and second solvent of about 40–60:60–40.

2. A process according to claim 1, wherein said mixed solvent is a mixture of xylene and di-isobutylcarbinol.

3. A process according to claim 1, wherein said mixed solvent is a mixture of di-isobutylcarbinol and alkylbenzenes whose vapor pressure attains a value of 1 atm. at a temperature of 160–190° C.

4. In a cyclic process for the production of hydrogen peroxide wherein alkylanthraquinone is catalytically hydrogenated in a solvent to the corresponding hydroanthraquinone and the latter is oxidized to produce hydrogen peroxide and alkylanthraquinone which is separated and returned to the hydrogenating stage, the improvement which comprises employing as alkylanthraquinone an amylanthraquinone mixture consisting of 2-tertiary-amylanthraquinone and 2-iso-secondary-amylanthraquinone at a ratio of 65–75 wt. percent of the former to 35–25 wt. percent of the latter, said mixture being dissolved in a mixed solvent composed of a first solvent selected from the group consisting of benzene, alkyl substituted benzene and alkyl substituted naphthalene and a second solvent selected from the group consisting of aliphatic alcohols having from 7 to 11 carbon atoms and alkylcyclohexanols in a volume ratio range between first and second solvent of about 40–60:60–40.

5. A process according to claim 4, wherein said mixed solvent is a mixture of xylene and di-isobutylcarbinol.

6. A process according to claim 4, wherein said mixed solvent is a mixture of di-isobutylcarbinol and alkylbenzenes whose vapor pressure attains a value of 1 atm. at a temperature of 160–190° C.

References Cited in the file of this patent

UNITED STATES PATENTS

| | | |
|---|---|---|
| 2,657,980 | Sprauer | Nov. 3, 1953 |
| 2,966,397 | Darbee et al. | Dec. 27, 1960 |

FOREIGN PATENTS

| | | |
|---|---|---|
| 1,063,581 | Germany | Aug. 20, 1959 |